United States Patent
Ito

(10) Patent No.: US 6,910,777 B2
(45) Date of Patent: Jun. 28, 2005

(54) PROJECTOR

(75) Inventor: Yoshitaka Ito, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 43 days.

(21) Appl. No.: 10/703,584

(22) Filed: Nov. 10, 2003

(65) Prior Publication Data

US 2004/0119949 A1 Jun. 24, 2004

(30) Foreign Application Priority Data

Nov. 15, 2002 (JP) ........................................ 2002-332225

(51) Int. Cl.⁷ .................. G03B 21/00; G03B 21/14; G03B 21/26; G02F 1/1335; G02F 1/03
(52) U.S. Cl. ...................... 353/31; 353/20; 353/34; 353/81; 353/84; 349/9; 359/487; 359/490; 359/495; 359/256; 359/634; 348/339
(58) Field of Search .................. 353/30–31, 20, 353/34, 81, 84, 122; 349/5, 8–9; 359/487, 490, 494–495, 497, 256, 634, 20; 348/338–339

(56) References Cited

U.S. PATENT DOCUMENTS

| | | | | |
|---|---|---|---|---|
| 5,969,832 A | * | 10/1999 | Nakanishi et al. | ............. 359/15 |
| 6,111,618 A | * | 8/2000 | Booth et al. | .................... 349/5 |
| 6,219,111 B1 | * | 4/2001 | Fukuda et al. | .................. 349/5 |
| 6,254,237 B1 | * | 7/2001 | Booth | ......................... 353/31 |
| 6,332,684 B1 | * | 12/2001 | Shibatani et al. | ............. 353/31 |
| 6,540,361 B1 | * | 4/2003 | Hayashi | ........................ 353/31 |

FOREIGN PATENT DOCUMENTS

| JP | 7-43658 A | 2/1995 |
|---|---|---|
| JP | A-8-304739 | 11/1996 |
| JP | EP 0 753 780 A1 | 1/1997 |
| JP | 9-230301 | 9/1997 |
| JP | 2001-255605 A | 9/2001 |
| JP | B2-3337022 | 8/2002 |

OTHER PUBLICATIONS

Yamaguchi, "Multiprimary Color Displays", *Color Forum Japan '99*, Kougaku Yon Gakkai (Four Optical Related Societies of Japan), Nov. 1999, pp. 73–79 (w/English–language translation).

* cited by examiner

Primary Examiner—Rodney Fuller
Assistant Examiner—Magda Cruz
(74) Attorney, Agent, or Firm—Oliff & Berridge, PLC

(57) ABSTRACT

To provide a compact projector in which a projection image is formed by using four kinds of color light so as to expand an expressible color gamut of the projection image and to achieve an excellent light utilization efficiency, a projector includes a light source, a color-separation optical system, a light-modulation optical system, and a color-synthesis optical system. The color-separation optical system produces four kinds of color light whose output directions are different from each other. The light-modulation optical system includes a first two-color-modulation electro-optical device to modulate any two of the four kinds of color light separated by the color-separation optical system and a second two-color-modulation electro-optical device to modulate the remaining two kinds of color light. Each two two-color-modulation electro-optical device includes a microlens array on a substrate close to the color-separation optical system and a plurality of sub-pixels corresponding to respective microlenses.

14 Claims, 9 Drawing Sheets

PROJECTOR

BACKGROUND OF THE INVENTION

1. Field of Invention

The present invention relates to projectors having a display feature in a wide color gamut, and more specifically, it relates to a projector which produces four kinds of color light from source light and forms a projection image by using the four kinds of color light.

2. Description of Related Art

Although color images of a projector are generally produced by using three kinds of primary color light; i.e., red light (R), green light (G), and blue light (B), unfortunately, as shown in the "RELATED ART" in FIG. 7, the above method cannot sufficiently cover a human-visible color gamut. Expansion of a color gamut of the projector is essential in order to faithfully reproduce real and natural colors, and if the projector can independently modulate color light having a wavelength of about 510 nm in addition to the related art red light (R), green light (G), and blue light (B), the expressible color gamut of the projector can be drastically expanded. With this background, projectors which produce color images by using four or more kinds of color light including the three kinds of primary color light have been studied. For example, see Japanese Unexamined Patent Application Publication No. 8-304739 (FIG. 8) and Yamaguchi: "Multi-Primary Color Display", Proceedings, Color Forum Japan '99, Kougaku Yon Gakkai (Four Optical Related Societies of Japan), pp. 73–79, November 1999.

The projectors of some types using multiple kinds of color light as mentioned above have been devised, for example, as presented in Yamaguchi. Related art projectors of typical types using four kinds of color light will be explained as below.

(1) Surface-dividing-type projectors having a structure in which, as similar to, for example, a triple-panel-type projector equipped with dichroic mirrors arranged in parallel so as to serve as a color-synthesis optical system, color-separation and color-synthesis optical systems are formed by arranging three pairs of dichroic mirrors in parallel, and four electro-optical devices are arranged between the two optical systems. Since a projection image is formed by using the four electro-optical devices to correspond four kinds of color light, a light utilization efficiency of the projector is higher than those of pixel-juxtaposed-type and time-sharing-type projectors, which will be described later, and a high luminance of a projection image can be easily achieved; however, since the projector requires a large number of electro-optical devices and also a large distance between the electro-optical devices and a projection lens in order to synthesize the four kinds of color light with the three dichroic mirrors, it is difficult to reduce the size and the cost of the projector.

(2) Pixel-juxtaposing-type projectors having a structure in which color filters to correspond four colors are arranged on a single plane so as to correspond to respective pixels formed in a pixel array of an electro-optical device, and thus to form a color projection image. Since the projector has a very simple structure and can produce a color projection image with a single electro-optical device, the size and the cost thereof can be easily reduced; however, since four kinds of color light are produced by the color filters, a light utilization efficiency of the projector is very low, whereby it is very difficult to achieve a high luminance of the projection image. Also, since the pixels are juxtaposed so as to correspond to respective spots of color light, high definition of the projection image is unlikely achieved.

(3) Time-sharing-type projectors having a structure in which, as similar to a way of producing a color image of, for example, a single-panel-type projector including a rotary color filter, projection images to correspond four kinds of color light are produced in a time sharing manner by rotating a color filter disk having color filters for four colors, arranged in a sectorial shape, and by displaying them in a temporarily continuous manner so as to impress a human to recognize them as a color image. Since a color projection image can be produced by a single electro-optical device, and also, a multi-color projection image can be easily produced, the size and the cost of the projector can be easily reduced. However, since a display time for each kind of color light is short, a light utilization efficiency of the projector is very low, whereby it is very difficult to achieve a high luminance of the projection image. Also, since the electro-optical device to form an image is required to respond quickly, it has a disadvantage of limited kinds of commercially available electro-optical devices.

(4) Pixel-spatially-disposing-type projectors having a structure in which an electro-optical device having microlenses, each for four pixels, disposed in an arrayed pattern is used, and a plurality of kinds of color light having different output directions from each other are produced from source light by a color-separation optical system formed by four dichroic mirrors arranged in a sectorial shape, hologram elements, or the like, and the plurality of kinds of color light are incident on the corresponding pixels so as to produce a color projection image. Since the color light is produced without a color filter, a light utilization efficiency of the projector is relatively higher than those of the time-sharing-type projector and the pixel-juxtaposing-type projector, and a high luminance of the projection image can be relatively easily achieved. Also, since the color projection image can be formed with a single electro-optical device, the size of the projector is easily reduced; however, since the pixels corresponding to respective spots of color light are juxtaposed in a similar fashion to those in the pixel-juxtaposing-type projector, high definition of the projection image is unlikely achieved. In addition, with collection performed by the microlenses (the maximum collecting angle α0) and directional separation performed by the color-separation optical system (the separation angle β0), each spot of color light separated by the color-separation optical system becomes a diverging ray having a wide angular distribution (the maximum divergent angle α0+β0) and is emitted from the electro-optical device. Although a projection lens having a small F-number and a large diameter greater than a flux diameter of each spot of diverging color light is needed in order to correspond to the diverging ray having a large angular distribution, such a lens is very expensive and the size of the projector is inevitably expanded.

As described above, although realizing a projector using multiple kinds of color light is in theory feasible to a sufficient degree, since it is difficult to achieve a high luminance and high definition of a projection image, to reduce the size and the cost of the projector, and so forth, all at the same time, such a projector of highly practical use has not been achieved.

Accordingly, the present invention provides a compact projector in which, by using four kinds of color light, a projection image is formed so as to expand a color expressible gamut compared to those of the related art projectors, which does not require a large-diameter and expensive projection lens, and which has an excellent light utilization efficiency.

SUMMARY OF THE INVENTION

In order to achieve the above-mentioned, a projector according to an aspect of the present invention includes a light source to emit light including visible light; a color-separation optical system to separate a flux emitted from the light source into four kinds of color light; a light-modulation optical system including a first two-color-modulation electro-optical device to modulate any two of the four kinds of color light separated by the color-separation optical system and a second two-color-modulation electro-optical device to modulate the remaining two kinds of color light; and a color-synthesis optical system to synthesize the four kinds of color light modulated by the light-modulation optical system. Each of the first and second two-color-modulation electro-optical devices includes a pair of substrates; an electro-optical material sandwiched between the pair of substrates; a microlens array disposed on one of the pair of substrates and close to the color-separation optical system; and a plurality of sub-pixel electrodes formed on the other substrate and arranged so as to correspond to respective microlenses of the microlens array.

Here, the color-separation optical system may include a first color-separation optical element to separate a flux emitted from the light source into two kinds of color light; a second color-separation optical element to separate one of the two kinds of color light separated by the first color-separation optical element into further two kinds of color light; and a third color-separation optical element to separate the other kind of color light separated by the first color-separation optical element into further two kinds of color light. The first to third color-separation optical elements and the color-synthesis optical system may be formed by dichroic mirrors or dichroic prisms. Also, the two-color-modulation electro-optical devices may be formed by liquid crystal panels using liquid crystal.

According to the above-mentioned aspect of the present invention, since the light-modulation optical system includes the two two-color-modulation electro-optical devices, each independently modulating two kinds of color light, the four kinds of color light can be independently modulated, whereby a projection image having a wide color expressible gamut can be formed by using the four kinds of color light. Also, since two kinds of color light are modulated by a single two-color-modulation electro-optical device, two units of electro-optical devices suffice despite independently modulating the four kinds of color light, thereby easily reducing the size, weight, and cost of the projector. Each two-color-modulation electro-optical device according to an aspect of the present invention, which is a so-called pixel-spatially-disposing-type electro-optical device, includes two kinds of sub-pixels formed in a matrix pattern, one of the two kinds of sub-pixels being adjacent to the other kind of sub-pixels, to independently modulate two kinds of color light, and also includes the microlenses at the incident side thereof in an arrayed pattern to collect the two kinds of color light and making them incident on the corresponding two kinds of sub-pixels. Since the two kinds of color light whose traveling directions have been previously separated by the color-separation optical elements are incident on the corresponding two-color-modulation electro-optical device and are independently modulated with respect to each sub-pixel, a color filter or the like is not needed for color synthesis, thereby achieving a high light utilization efficiency. As a result, expansion of a color expressible gamut and a high luminance of a projection image can be both achieved.

The projector according to an aspect of the present invention may further include a polarization-converting optical system between the light source and the light-modulation optical system, to convert unpolarized light emitted from the light source into light whose polarization direction is aligned. In this case, preferably the light emitted from the polarization-converting optical system and whose polarized direction is aligned is S-polarized light.

Each two-color-modulation electro-optical device of the projector according to an aspect of the present invention is assumed to be formed by a liquid crystal panel requiring polarized light to display an image. On the basis of the above assumption and with the above-mentioned structure, a utilization efficiency of light emitted from the light source can be drastically enhanced, thereby achieving a further higher luminance of a projection image. Also, by converting light emitted from the polarization-conversing optical system into S-polarized light, reflectances of color-light separation surfaces (dichroic surfaces) of the color-separation optical system and a color-light synthesis surface (dichroic surface) of the color-synthesis optical system can be made higher, thereby enhancing a light utilization efficiency and achieving a further higher luminance of a projection image.

From the same point of view, it is preferable that two kinds of color light reflected at and separated by the first color-separation optical element be set to include one kind of color light whose light intensity is the smallest among the four kinds of color light emitted from the light source. With this arrangement, since reflectances of the reflecting surfaces of the color-separation optical system and the color-synthesis optical system can be made higher, the light intensity of the above kind of color light is easily balanced with those of the other kinds of color light, and a color expressible gamut of the projector can be expanded without reducing its light utilization efficiency, thereby achieving a bright projection image having excellent color balance. When a high-pressure mercury-vapor lamp or a metal halide lamp is used as the light source lamp, since a slightly insufficient amount of red color is emitted, color light reflected at and separated by the first color-separation optical element is preferably set to include red light. Also, when another metal halide lamp, a halogen lamp, or a xenon lamp is used as the light source lamp, since a slightly insufficient amount of blue light is emitted, color light reflected at and separated by the first color-separation optical element is preferably set to include blue light.

When the projector according to an aspect of the present invention includes the polarization-conversing optical system, it is preferable that a polarization rotating element to rotate the polarization direction of light in a specific wavelength band at about 90 degrees be included in the projector so as to be disposed close to the output side of the polarization-conversing optical system; two kinds of color light passing through the first color-separation optical element be set to be P-polarized light; and the remaining two kinds of color light reflected at the first color-separation optical element be set to be S-polarized light. Also, it is preferable that at least one polarization rotating element to rotate the polarization direction of light in a specific wavelength band at about 90 degrees be included in the projector so as to be disposed at the incident side of at least one of the second and third color-separation optical elements; at least one of the four kinds of color light passing through at least one of the second and third color-separation optical elements be set to be P-polarized light; and at least one of the remaining two kinds of color light reflected at at least one of the second and third color-separation optical elements be set to be S-polarized light.

The color-light separation surface (dichroic surface) of each color-separation optical element is in general likely to have a high transmittance and a high reflectance when light incident thereon is P-polarized and S-polarized, respectively. Thus, with the above-mentioned structure, since color light passing through each color-separation optical element is selectively converted into P-polarized light while color light reflected at each color-separation optical element remains as S-polarized light, separation accuracy and efficiency of the color-separation optical element to separate color light can be enhanced, whereby both expansion of a color expressible gamut and improvement of brightness of a projection image can be achieved.

Each two-color-modulation electro-optical device of the projector according to an aspect of the present invention is assumed to be formed by a liquid crystal panel requiring polarized light to display an image. On the basis of the above assumption, it is preferable that a polarization rotating element to rotate the polarization direction of light in a specific wavelength band at about 90 degrees be included in the projector so as to be disposed at least one of the incident and output sides of the two-color-modulation electro-optical device to modulate color light to be synthesized by reflection at the color-synthesis optical system, and color light to be synthesized by reflection at the color-synthesis optical system be set to be S-polarized light.

Since light emitted from each two-color-modulation electro-optical device (liquid crystal panel) is polarized, taking a light synthesis efficiency (obtained by a transmittance and a reflectance) of the color-light synthesis surface (dichroic surface) of the color-synthesis optical system into consideration, when color light to be synthesized by reflection is set to be S-polarized light and color light to be synthesized by transmittance is set to be P-polarized light, color synthesis can be performed at high efficiency, thereby achieving high image quality and a high luminance of a projection image. The polarization rotating element may be arranged close to either one of the two two-color-modulation electro-optical devices or at either one of the incident and output sides of one of the two-color-modulation electro-optical devices. Since the arranging position of the polarization rotating element has influence on the arrangement configuration of the color-light synthesis surface (dichroic surface) of the color-synthesis optical system, the polarization rotating element is arranged such that color light to be synthesized by reflection at the color-light synthesis surface (dichroic surface) of the color-synthesis optical system is converted into S-polarized light. Meanwhile, when the projector includes no polarization-conversing optical system, and also the polarization rotating element is arranged at the incident side of one of the two-color-modulation electro-optical devices, it is necessary to arrange the polarization rotating element at the output side of a polarizer close to the light source.

The projector according to an aspect of the present invention may have a structure in which two collimating lenses are respectively arranged at the incident sides of the first and second two-color-modulation electro-optical devices, or alternatively, at the incident sides of the second and third color-separation optical elements. When the two collimating lenses are arranged, in the former case, an angular distribution of a flux incident on each of the two-color-modulation electro-optical devices can be made narrower, thereby effectively achieving high image quality and a high luminance of a projection image, and in the latter case, an angular distribution of a flux incident on each of the second and third color-separation optical elements can be made narrower, whereby the second and third color-separation optical elements accurately perform color separation, thus preventing unevenness of a projection image, and achieving high image quality and a high luminance of the same.

Also, when the projector according to an aspect of the present invention includes the polarization-converting optical system, the polarization-converting optical system may include a flux dividing element disposed between the light source and the first color-separation optical elements; a group of a collection optical element, a polarization separating element, a polarization converting element, and a superimposing element, disposed between the first color-separation optical element and the second color-separation optical element; and another group of a collection optical elements, a polarization separating element, a polarization converting element, and a superimposing element, disposed between the first color-separation optical element and the third color-separation optical element. When the projector is constructed so as to include the above-mentioned polarization-converting optical system, the size of the projector can be reduced, and also, since a wavelength band of color light incident on each group of the polarization-converting optical system is limited, a polarization conversion efficiency of one of the four kinds of color light emitted from the light source—the one having the smallest light intensity, can be effectively enhanced, whereby both expansion of a color expressible gamut and enhancement of brightness of a projection image can be achieved.

In addition, it is preferable that the projector according to an aspect of the present invention may have a structure in which one of the first and second two-color-modulation electro-optical devices modulates blue light and green light at a shorter wavelength side, and the other modulates green light at a longer wavelength side and red light. Here, a boundary wave length between the green light at the shorter wavelength side and the green light at the longer wavelength side can be set approximately in the range from 515 nm to 540 nm. Also, positions of the four kinds of color light incident on corresponding sub-pixels are preferably set such that sub-pixels in one of the two-color-modulation electro-optical devices, to modulate the green light at the shorter wavelength side, and other sub-pixels in the other two-color-modulation electro-optical device, to modulate the green light at the longer wavelength side, do not overlap with each other at the time of color synthesis.

When the following two points are taken into consideration, that is, the one is that a color expressible gamut of a currently available display element using three kinds of primary color light is pretty narrow especially in the vicinity of the wavelength band from 490 nm to 570 nm with respect to a human visible color gamut, and the other is that the human visual sensitivity to green color light is high and the green color light wields a large influence on a sense of resolution at the time of appreciating a projection image, by separating the wavelength band of the green light into two parts and by modulating the green light in one part of the wavelength independently of that in the other part, a color expressible gamut (color gamut) of a projection image, nearly as wide as that of the human visible color gamut, and a high sense of resolution at the time of viewing the projection image can be achieved. Furthermore, when a certain type of a metal halide lamp which emits light having two strong bright-line spectra in the vicinities of 490 nm and 560 nm is used as the light source, by setting a boundary wavelength of the green light at the shorter wavelength side and the green light at the longer wavelength side between these two bright-line spectra, the green light tinged with blue and the green light tinged with yellow can be independently modulated from each other, thereby further effectively expanding an expressible color gamut of a projection image.

DETAILED DESCRIPTION OF EXEMPLARY EMBODIMENTS

Exemplary embodiments of the present invention will be described with reference to the accompanying figures.

1. First Exemplary Embodiment

Figure 1:
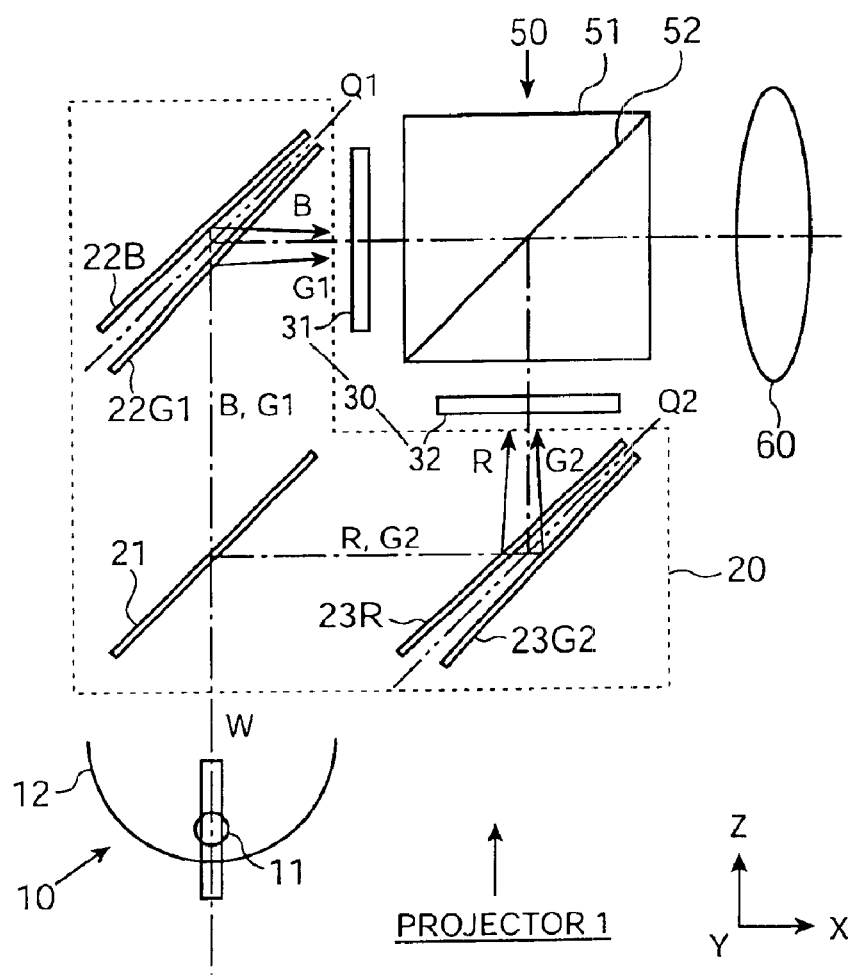
FIG. 1 is a schematic illustrating the structure of a projector according to a first exemplary embodiment of the present invention.

FIG. 1 shows a schematic structure of a projector 1 according to a first exemplary embodiment of the present invention. The projector 1 is generally formed by a light source 10 to emit light including visible light; a color-separation optical system 20 to separate the light emitted from the light source into four kinds of color light, each having a different wavelength band from the others; a light-modulation optical system 30 to form an optical image of each kind of color light by optically modulating the color light on the basis of external image information; a color-synthesis optical system 50 to form one color image by synthesizing the formed optical images; and a projection optical system 60 to project the formed color image onto a projection surface (not shown).

Although not shown in FIG. 1, a uniform illumination optical system to make uniform an intensity distribution of an illumination flux incident on the light-modulation optical system 30 and a polarization-converting optical system to converge light emitted from the light source into polarized fluxes having an aligned polarization direction can be disposed between the light source 10 and the light-modulation optical system 30. The uniform illumination optical system divides a flux emitted from the light source 10 into a plurality of sub-fluxes so as to uniformly illuminate image forming areas of first and second two-color-modulation liquid crystal panel 31 and 32, which will be described later, and is formed by a lens array, a rod lens, and the like. The polarization-converting optical system separates an unpolarized flux emitted from the light source 10 into two kinds of polarized fluxes whose polarization directions are orthogonal to each other; emits the two kinds of polarized fluxes by rotating the polarization direction of one of the two kinds of the polarized fluxes so as to align the polarization direction with that of the other kind of the polarized flux; and is formed by a polarization separating film, a reflecting film, a retardation film, and the like.

The light source 10 includes a light source lamp 11 to radially emit light rays and a reflector 12 to unidirectionally emit the light rays emitted from the light source lamp 11. A high-pressure mercury-vapor lamp, a metal halide lamp, a halogen lamp, a xenon lamp, or the like can be used as the light source lamp 11, and a parabolic reflector, an ellipsoidal reflector, a spherical reflector, or the like can be used as the reflector 12.

Figure 2:
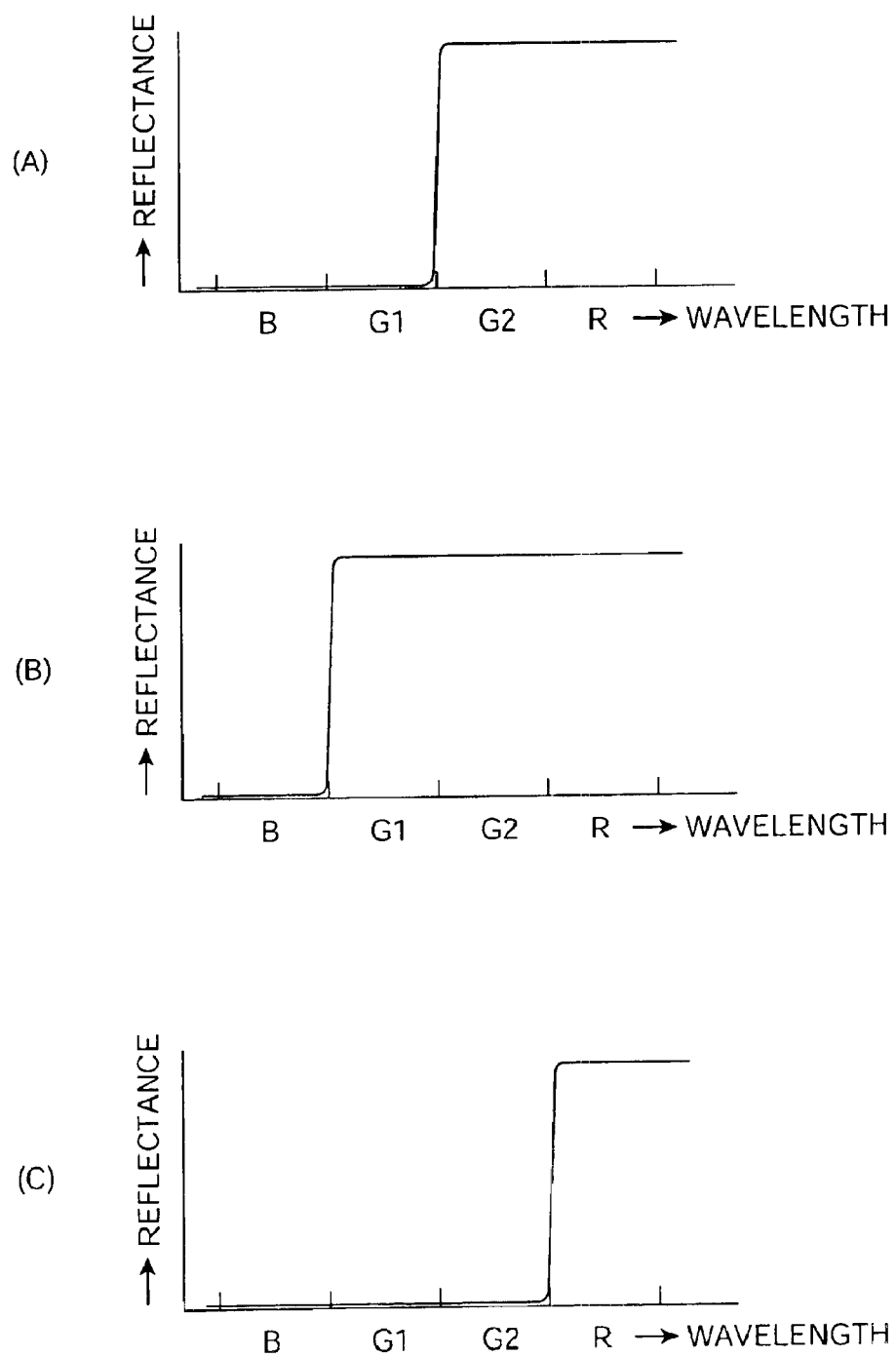
FIGS. 2A to 2C illustrate spectral reflectance characteristics of dichroic mirrors according to the first exemplary embodiment.
Figure 3:
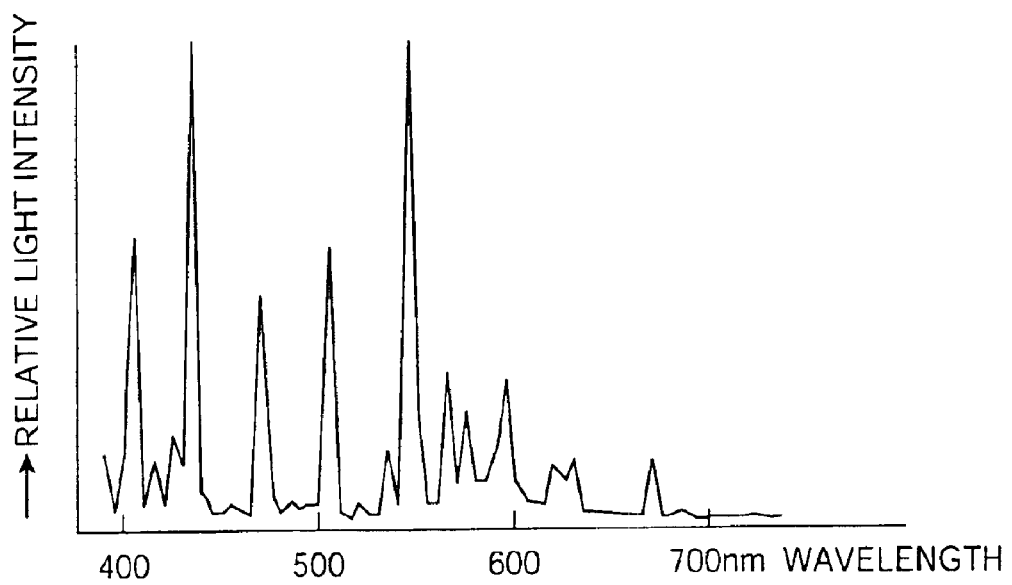
FIG. 3 illustrates an emission spectrum distribution of a light source lamp 11 according to the first exemplary embodiment.

The color-separation optical system 20 includes a dichroic mirror 21 serving as a first color-separation optical element, a dichroic mirror 22G1 serving as a second color-separation optical element, a reflecting mirror 22B, a dichroic mirror 23R serving as a third color-separation optical element, and a reflecting mirror 23G2. Each of the three kinds of dichroic mirrors 21, 22G1, and 23R has a wavelength selective property of passing or reflecting color light in a specific wavelength band, and is made by forming a dielectric multilayer film on a transparent substrate composed of glass or the like. FIGS. 2A, 2B, and 2C illustrate one example of spectral reflectance characteristics of the dichroic mirrors 21, 22G1, and 23R, respectively. Here, FIG. 2A, FIG. 2B and FIG. 2C illustrate the dichroic mirror 21, the dichroic mirror 22G1 and the dichroic mirror 23R, respectively. Here, although blue light B, green light G1, green light G2, and red light R shown in the figures are assumed to lie approximately in wavelength bands from 380 nm to 495 nm, from 495 nm to 525 nm, from 525 nm to 585 nm, and from 585 nm to 780 nm, respectively, the present invention is not limited to this setting. However, when the following two points are taken into consideration, that is, that a color expressible gamut of a currently available display element using three kinds of primary color light is pretty narrow especially in the vicinity of the wavelength band from 490 nm to 570 nm with respect to the human visible color gamut, and the other is that the human visual sensitivity to green color light is high and the green color light wields a large influence on a sense of resolution at the time of appreciating a projection image, it is preferable that the wavelength band of the green light be separated into two parts and the green light in one part of the wavelength be modulated independently of that in the other part. FIG. 3 illustrates an emission spectrum distribution of a metal halide lamp serving as an example of the light source lamp 11. With this light source lamp, since two bright-line spectra having large relative light intensities exist in the vicinities of wavelengths of 505 nm and 545 nm which are included in the wavelength band of the green light, by setting two kinds of color light including bright lines at the wavelengths of 505 nm and 545 nm as green light G1 at the shorter wavelength side (green light tinged with blue) and green light G2 at the longer wavelength side (green light tinged with yellow), respectively, and by independently modulating the two kinds of green light G1 and G2, the color expressible gamut is expanded and a sense of resolution at the time of viewing a projection image is enhanced.

Although the dichroic mirror 21 allows blue light B and green light G1 at the shorter wavelength side to pass through and reflects red light R and green light G2 at the longer wavelength side; the dichroic mirror 22G1 reflects green light G1 at the shorter wavelength side and allows blue light B to pass through; and the dichroic mirror 23R reflects red light R and allows green light G2 at the longer wavelength side to pass through, the present invention is not limited to this arrangement. A spectral reflectance characteristic of each dichroic mirror depends on the arrangement of the mirror. For example, although the dichroic mirror 22G1 may reflect blue light B and allow green light G1 at the shorter wavelength side to pass through, in this case, it is needed to arrange the dichroic mirror 22G1 and the reflecting mirror 22B so as to expand the distance between them in directions opposite to those shown in FIG. 1 (in FIG. 1, the distance between them becomes smaller towards the positive X and Z directions). Also, since the reflecting mirrors 22B and 23G2 are arranged to reflect two kinds of color light passing through the dichroic mirrors 22G1 and 23R, respectively, in predetermined directions, although commonly used reflecting mirrors may be used, dichroic mirrors are preferably used for such reasons that high reflectance is easily obtained, and high color purity is easily obtained by selectively reflecting color light in a specific wavelength band.

A flux emitted from the light source 10 is separated by the dichroic mirror 21 into a mixture of blue light B and green light G1 at the shorter wavelength side and another mixture of red light R and green light G2 at the longer wavelength side. The mixture of the blue light B and the green light G1 passing through the dichroic mirror 21 is separated by the dichroic mirror 22G1 into the blue light B and the green light G1. Subsequently, the green light G1 is incident directly on the first two-color-modulation liquid crystal panel 31 (first two-color-modulation electro-optical device), which will be described later, and the blue light B is reflected at the reflecting mirror 22B and incident on the first two-color-modulation liquid crystal panel 31. The other mixture of the red light R and the green light G2 at the longer wavelength side reflected at the dichroic mirror 21 is separated by the dichroic mirror 23R into the red light R and the green light G2. Subsequently, the red light R is incident directly on the second two-color-modulation liquid crystal panel 32 (second two-color-modulation electro-optical device), which will be described later, and the green light G2 is reflected at the reflecting mirror 23G2 and is incident on the second two-color-modulation liquid crystal panel 32. Meanwhile, the positional relationship between the dichroic mirror 22G1 and the reflecting mirror 22B may be reversed to that in the present exemplary embodiment, that is, color light emitted from the dichroic mirror 21 may be incident first on the reflecting mirror 22B as long as the reflecting mirror 22B is replaced with a dichroic mirror. The positional relationship between them should be determined taking the intensity ratio of the two kinds of color light emitted from the light source into consideration. When the dichroic mirror is arranged such that one of the two kinds of color light having a smaller light intensity relative to that of the other is first reflected, since color balance of the intensity ratios among them can be well established, a color expressible gamut of the projector is effectively expanded. With the same reason, the positional relationship between the dichroic mirror 23R and the reflecting mirror 23G2 may be reversed to that in the present exemplary embodiment.

Here, the kind of color light reflected at and separated by the dichroic mirror 23R and the dichroic mirror 21 is set as the one having the smallest light intensity among those emitted from the light source or as a plurality of kinds of color light including the above one. The reason for this is such that, since a dichroic mirror is in general likely to increase its reflectance than its transmittance, when it is arranged so as to serve as reflecting color light having the smallest light intensity threat, a light loss of the color light can be effectively reduced, and color balance of the four kinds of color light can be well established without reducing light intensities of the other kinds of color light. With this arrangement, a light utilization efficiency of the projector is enhanced and its color expressible gamut is also expanded, whereby a bright projection image having excellent color balance is achieved. To be specific, since it is assumed in the present exemplary embodiment that a metal halide lamp, or a high-pressure mercury-vapor lamp, which emits red light having a relatively small light intensity, is used as the light source lamp, in order to reduce a loss of red light, the two dichroic mirrors 21 and 23R are set so as to reflect red light threat. From the same point of view, the dichroic mirror 23R is arranged in front of the reflecting mirror 23G2 (close to the light source). The reason for arranging the dichroic mirror 22G1 in front of the reflecting mirror 22B (close to the light source) will be describe later.

The dichroic mirror 22G1 and the reflecting mirror 22B are arranged such that a flux emitted from the light source 10 is incident thereon at different angles from each other. To be specific, a virtual axis Q1 is set in the X–Z plane so as to form an angle of 45 degrees with respect to the center line of an incident flux, and the two dichroic mirrors 22G1 and 22B are arranged so as not to be parallel to each other with respect to the virtual axis as the symmetrical axis thereof (in FIG. 1, the distance between the two mirrors becomes smaller towards the positive X and Z directions). Accordingly, the green light G1 reflected at the dichroic mirror 22G1 and the blue light B reflected at the reflecting mirror 22B are separated in slightly different two directions from each other in the X–Z plane. Likewise, a virtual axis Q2 is set so as to form an angle of 45 degrees with respect to the center axis of an incident flux, and the dichroic mirror 23R and the reflecting mirror 23G2 are arranged so as to be not parallel to each other with this virtual axis as the symmetrical axis thereof. Accordingly, the red light R reflected at the dichroic mirror 23R and the green light G2 reflected at the reflecting mirror 23G2 are emitted in slightly different two directions from each other in the X–Z plane. Meanwhile, the arrangement configurations between the dichroic mirror 22G1 and the reflecting mirror 22B and between the dichroic mirror 23R and the reflecting mirror 23G2 are not limited to the above mentioned ones. Although the distances between the two pairs of mirrors become smaller towards the positive X and Z directions in FIG. 1, the projector may have an arrangement configuration in which the distances between them become larger towards the positive X and Z directions.

The light-modulation optical system 30 includes two two-color-modulation electro-optical devices to modulate color light; that is, the one is the first two-color-modulation liquid crystal panel 31 (first two-color-modulation electro-optical device) and the other is the second two-color-modulation liquid crystal panel 32 (second two-color-modulation electro-optical device). These first and second two-color-modulation liquid crystal panels 31 and 32 are of the same type and distinguished by the kinds of color light respectively modulated thereby. In an aspect of the present invention, the blue light B and the green light G1 are modulated by the first two-color-modulation liquid crystal panel 31, and the red light R and the green light G2 are modulated by the second two-color-modulation liquid crystal panel 32.

Figure 4:
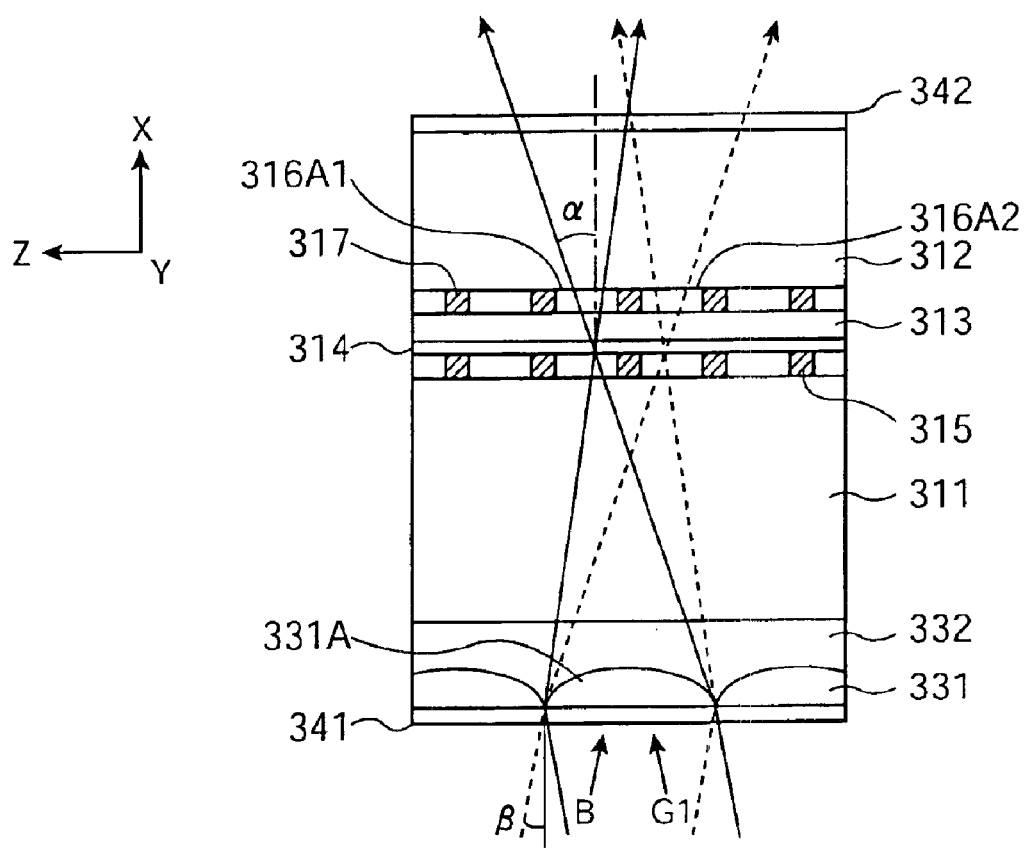
FIG. 4 is a sectional view illustrating the schematic structure of a two-color-modulation liquid crystal panel according to the first exemplary embodiment.

The two-color-modulation liquid crystal panels 31 and 32 are of a transmissive type, each independently performing optical modulation of two kinds of incident color light on the basis of external image information (not shown) so as to form corresponding optical images, and emit corresponding modulated fluxes from the sides opposite to the incident sides thereof, as the sectional structure of the first two-color-modulation liquid crystal panel 31 is shown in FIG. 4 by way of example. Each of the two-color-modulation liquid crystal panels 31 and 32 has substantially the same schematic structure as that of a general monochrome liquid crystal panel except for sub-pixels 316A1 and 316A2 and corresponding microlenses, wherein, since the sub-pixels refers to pixels driven by corresponding sub-pixel electrodes, which will be described later, they are denoted by the same reference numerals as those of the corresponding sub-pixel electrodes. More particularly, the liquid crystal panel has a schematic structure in which two transparent substrates (a counter substrate 311 and a TFT substrate 312) composed of glass or the like have twisted nematic (TN) liquid crystal 313 as an electro-optical material sealed therebetween; the counter substrate 311 has common electrodes 314, a black matrix 315 for shielding unnecessary light, and the like formed thereon; and the TFT substrate 312 has two kinds of sub-pixel electrodes 316A1 and 316A2, and thin film transistors (TFTs) 317 serving as switching elements, and the like formed thereon. When voltage is applied on the sub-pixel electrodes 316A1 and 316A2 via the corresponding TFTs 317, the liquid crystal 313 sandwiched between the common electrodes 314 and the foregoing sub-pixel electrodes is driven.

The counter substrate 311 has a microlens array 331 arranged on the incident side thereof, including a plurality of unit microlenses 331A formed in a matrix pattern. The unit microlenses 331A are formed on a glass plate, for example, by etching, and bonded to the counter substrate 311 having a resin layer (adhesive agent) 332 interposed therebetween, the resin layer having a refractive index different from that of the glass plate having the microlenses formed thereon. The microlens array 331 independently collects the two kinds of color light whose output directions are separated by the dichroic mirror 22G1, the reflecting mirror 22B, and the like, (or by the dichroic mirror 23R, the reflecting mirror 23G2, and the like), and makes them incident on the corresponding sub-pixels 316A1 and 316A2 in a spatially separated state. In other words, the microlens array 331 is formed so as to make one unit microlens 331A to correspond to a pair of the sub-pixels 316A1 and 316A2 formed side by side in the Z-direction. With this arrangement, the direction in which the pair of sub-pixels 316A1 and 316A2 are formed side by side is set at a direction (in the X–Z plane shown in FIG. 1) along which the output directions of the two kinds of color light are separated by the dichroic mirror 22G1, the reflecting mirror 22B, and the like, (or by the dichroic mirror 23R, the reflecting mirror 23G2, and the like). Here, the Z-direction width of the unit microlens 331A is set almost equal to the sum of the Z-direction widths of the sub-pixels 316A1 and 316A2, the Y-direction length thereof is set almost equal to that of the sub-pixel 316A1 or 316A2 (since the two sub-pixels have a common length). Meanwhile, although the Z-direction width of each of the sub-pixel electrodes 316A1 and 316A2 is set about half the Y-direction length thereof in order to make square the shape of each pixel at the time of displaying a white color, the present invention is not limited to this setting.

The TFT substrate 312 and the microlens array 331 have polarizers 342 and 341 respectively arranged on the light-output side and light-incident side thereof. Meanwhile, the liquid crystal 313 is not only of a TN type but also may be of any one of a variety of types including a ferroelectric type, an anti-ferroelectric type, a homogenous alignment type, and a hometropic alignment type.

As shown in FIGS. 1 and 4, the green light G1 and the blue light B whose output directions are respectively separated by the dichroic mirror 22G1 and the reflecting mirror 22B are incident on each unit microlens 331A on the first two-color-modulation liquid crystal panel 31 at different angles from each other. The green light G1 and the blue light B incident on the unit microlens 331A are emitted from the unit microlens 331A at different angles from each other and are separately collected in the vicinities of the pair of corresponding sub-pixels 316A1 and 316A2 formed side by side in the Z-direction. Subsequently, the green light G1 and the blue light B are modulated by the corresponding sub-pixels 316A1 and 316A2, and then are emitted therefrom at angles which are substantially symmetrical to each other with respect to a direction orthogonal to the surface of the first two-color-modulation liquid crystal panel 31 on which a flux is incident (i.e., the X-direction shown in FIG. 4). Likewise, the red light R and the green light G2, whose output directions are separated by the dichroic mirror 23R and the reflecting mirror 23G2, are modulated by the corresponding sub-pixels 316A1 and 316A2 of the second two-color-modulation liquid crystal panel 32, and then are emitted at angles which are substantially symmetrical to each other with respect to a direction orthogonal to the surface of the second two-color-modulation liquid crystal panel 32 on which a flux is incident.

Figure 5:
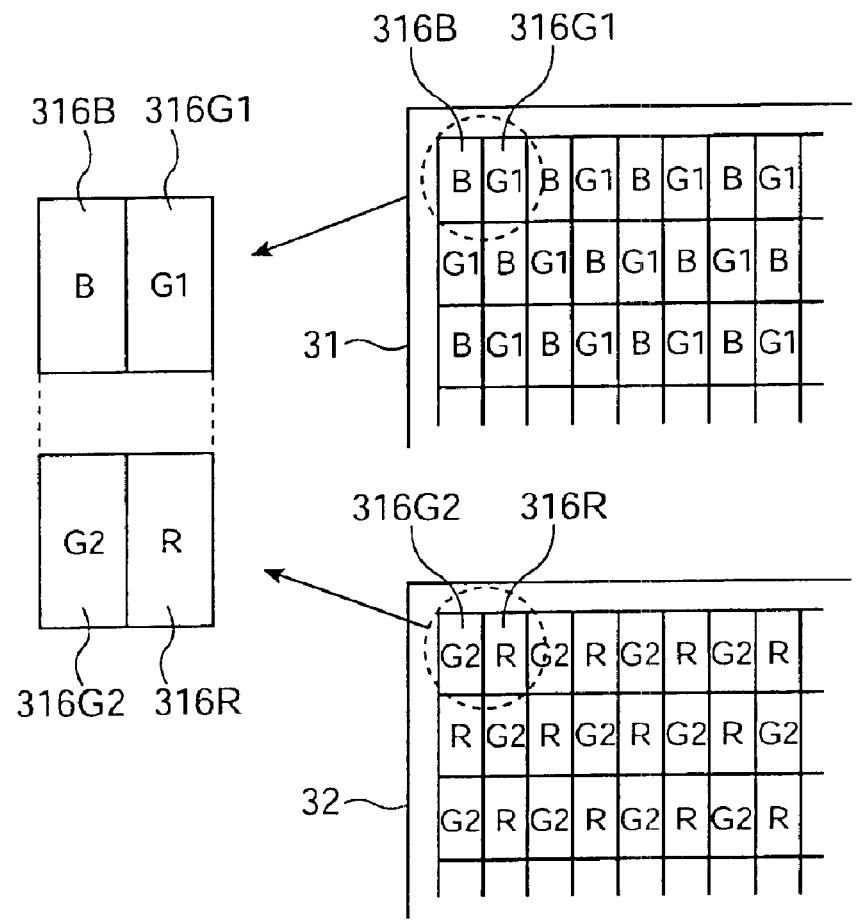
FIG. 5 illustrates an array of sub-pixels of the two-color-modulation liquid crystal panel and a two-color-modulation liquid crystal panel according to the first exemplary embodiment, and a positional relationship of the sub-pixels between the two two-color-modulation liquid crystal panels.

FIG. 5 illustrates an array of the sub-pixels of the first and second two-color-modulation liquid crystal panels 31 and 32, and a relative positional relationship of the sub-pixels between the first and second two-color-modulation liquid crystal panels 31 and 32. The first two-color-modulation liquid crystal panel 31 has image forming areas (sub-pixels) 316B and image forming areas (sub-pixels) 316G1 on which the blue light B and the green light G1 are respectively incident, and the second two-color-modulation liquid crystal panel 32 has image forming areas (sub-pixels) 316G2 and image forming areas (sub-pixels) 316R on which the green light G2 and the red light R are respectively incident, both arranged in a checkered pattern. Also, the image forming areas (sub-pixels) 316B and the image forming areas (sub-pixels) 316G2 are arranged between the two two-color-modulation liquid crystal panels 31 and 32 so as to correspond to (so as to spatially overlap with) the respective image forming areas (sub-pixels) 316G1 and image forming areas (sub-pixels) 316R. Since a human visibility to green light is high, the image forming areas (sub-pixels) 316G1 and the image forming areas (sub-pixels) 316G2 are arranged so as not to correspond to each other(not to spatially overlap with each other), expecting that a sense of resolution of a projection image is enhanced. The arrangement relationship between the dichroic mirror 22G1 and the reflecting mirror 22B is set so as to provide the above-mentioned arrangement relationship among the sub-pixels.

Figure 6:
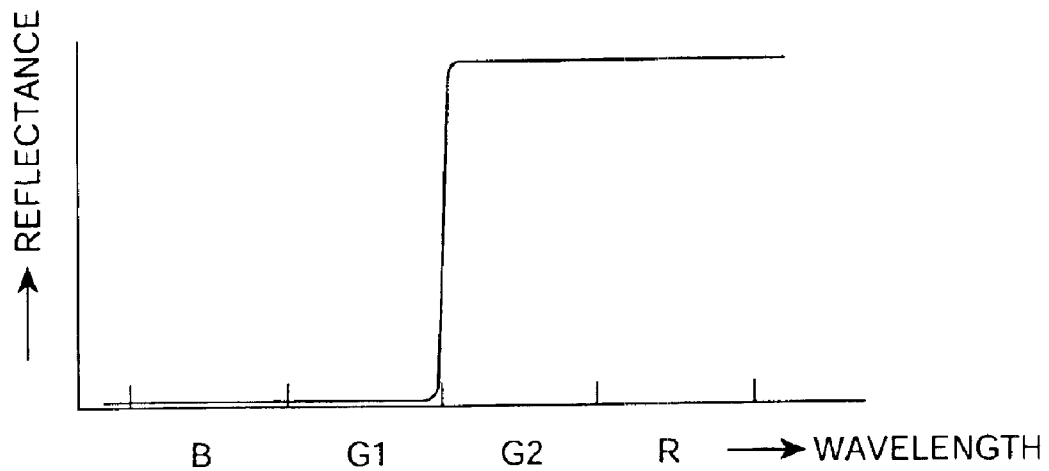
FIG. 6 schematically illustrates a spectral reflectance characteristic of a dichroic prism according to the first exemplary embodiment.

As shown in FIG. 1, the color-synthesis optical system 50 includes a dichroic prism 51, and synthesizes the four kinds of modulated color light emitted from the first and second two-color-modulation liquid crystal panels 31 and 32 so as to form a color image. FIG. 6 illustrates a spectral characteristic of the dichroic prism 51. The dichroic prism 51 has a cubic shape in which a dichroic surface is sandwiched by two transparent media, each having an approximately triangular prism shape, and includes a dielectric multilayer film 52 formed along a diagonal line of a square in plane view thereof, which allows the blue light B and the green light G1 at the shorter wavelength side to pass therethrough and reflects the green light G2 at the longer wavelength side and the red light R threat. The color image synthesized by the color-synthesis optical system 50 is emitted from a projection lens (projection optical system) 60 and is projected onto a screen (not shown) in a magnified manner.

Figure 7:
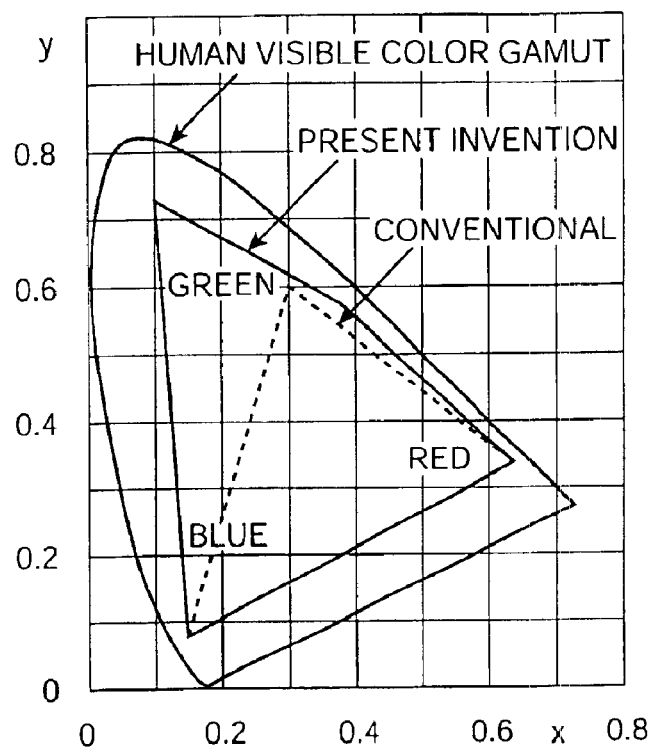
FIG. 7 is a chromaticity schematic representing a color expressible gamut of the projector according to the first exemplary embodiment.

The projector according to the first exemplary embodiment has the following advantages. Since the light-modulation optical system 30 includes the first and second two-color-modulation liquid crystal panels 31 and 32, a projection image having a large color expressible gamut can be formed by using the four kinds of color light. FIG. 7 illustrates a color expressible gamut of the projector 1. In the projector 1 according to an aspect of the present invention, especially the two kinds of green light G1 and G2 are independently modulated, whereby it is obvious that a larger color expressible gamut is realized in comparison to that of a projector using the related art three kinds of primary color light {three primary colors}.

Also, in comparison to the four kinds of projectors previously mentioned in Description of the Related Art, since color light can be produced without a color filter, a projection image having higher definition and being brighter than that produced by the time-sharing-type projector or the pixel-juxtaposing-type projector can be formed. Also, in comparison to the surface-dividing-type projector, since the distances between the two-color-modulation liquid crystal panels and the projection lens can be shortened, the projector according to the present exemplary embodiment is likely to achieve a reduced size and a high luminance of a projection image. In addition, in comparison to the pixel-spatially-disposing-type projector, since a projection lens having a large diameter and hence being expensive is not needed, the projector according to the present exemplary embodiment is likely to achieve reduction in size and cost. That is, according to the present invention, an excellent projector having a relatively high light utilization efficiency, a high luminance of a projection image, and reduction in size and cost can be achieved.

Especially, in detail comparison to the pixel-spatially-disposing-type projector equipped with an electro-optical device having a similar structure to that according to an aspect of the present invention, if these electro-optical devices are same in size, when compared to a known four-color-modulation liquid crystal panel including microlenses, each for four sub-pixels, use of the first and second two-color-modulation liquid crystal panels 31 and 32 doubles the sizes of the sub-pixels 316A1 and 316A2 in the Z-direction (i.e., a direction along which an incident color light is directionally separated). When the sub-pixels 316A1 and 316A2 become larger, since the focal length of each unit microlens 331A arranged in front of the above sub-pixels can be set relatively large, as shown in FIG. 4, the maximum collecting angle $\alpha$ of a flux collected by the microlens can be made smaller, whereby the maximum diverging angle $\alpha$ (same the maximum collecting angle $\alpha$) of a flux emitted from either of the first and second two-color-modulation liquid crystal panels 31 and 32 can be made smaller. Also, different from the known four-color-modulation liquid crystal panel, since each of the first and second two-color-modulation liquid crystal panels 31 and 32 has two kinds of color light being incident thereon, as shown in FIG. 4, a separation angle $\beta$ of each of the four kinds of color light directionally separated by the color-separation optical system 20 and being incident on the first and second two-color-modulation liquid crystal panels 31 and 32 from different directions from each other can be made smaller.

Thus, when compared to the pixel-spatially-disposing-type projector equipped with the known four-color-modulation liquid crystal panel, in the projector according to an aspect of the present invention equipped with the two two-color-modulation liquid crystal panels, since the maximum diverging angle of diverging light emitted from the light-modulation optical system can be made smaller, a small F-number projection lens having a large diameter and being thus expensive is not needed even in order to achieve high definition of the light-modulation optical system (electro-optical device), a bright color image having excellent color balance can be projected without reducing a light utilization efficiency of the projector. When the maximum diverging angle $(\alpha+\beta)$ of diverging light emitted from either of the first and second two-color-modulation liquid crystal panels 31 and 32 is set equal to that of the four-color-modulation liquid crystal panel, a reduced focal length of each microlens can make further smaller the diameter of a flux incident on the sub-pixels 316A1 and 316A2, thereby enhancing a incident efficiency of color light incident on the corresponding sub-pixels and also reducing or preventing unnecessary color light from being incident on the neighboring sub-pixels of the foregoing sub-pixels so as not to cause color mixture; as a result, a color image having excellent color reproductabity without exudation can be projected.

Also, in comparison to the four-color-modulation liquid crystal panel, since each of the sub-pixels 316A1 and 316A2 has a large size, positioning accuracy of each of the two-color-modulation liquid crystal panels relative to any of an illumination optical system including the light source, the projection lens, and the like is not severely required, whereby the projector can be easily manufactured by that much.

In the projector according to an aspect of the present invention, the dichroic mirrors (plate-shaped) 21, 22G1, and 23R and the reflecting mirrors 22B and 23G2 are used in the color-separation optical system 20, thereby easily achieving a light-weight and low-cost projector. Also, the dichroic prism 51 is used in the color-synthesis optical system 50. Since separation and synthesis characteristics of color light at a dichroic surface generally have angular dependence of an incident light on the dichroic surface, it is important to make the incident angle of the light small in order to effectively separate and synthesize the color light. Accordingly, when the block-shaped dichroic prism 51 is used, since the dichroic surface thereof is sandwiched by the media having higher refractive index than air, the incident angle of light can be made relatively small, thereby effectively performing color synthesis of the color light and suppressing occurrence of color unevenness when performing the color synthesis. Also, since the dichroic surface is unlikely to be warped, a projection image is not distorted, thereby achieving high image quality of the projection image.

In addition, the color-separation optical system 20 is constructed such that red light is reflected and is separated thereby. Since a dichroic mirror in general easily achieves a high reflectance, even when a light source lamp (for example, a part of a metal halide lamp or a high-pressure mercury-vapor lamp) which emits red light having a relatively small light intensity is used as the light source, the red light can be fully utilized without being wasted. With this arrangement, the light intensity of the red light is easily balanced with those of the other kinds of color light, and a color expressible gamut of the projector can be expanded without reducing its light utilization efficiency, thereby achieving a bright projection image having excellent color balance. Also, since the four kinds of color light are synthesized by the color-synthesis optical system 50 so as to reduce or prevent the two kinds of green light G1 and G2 from being overlapped with each other, when the fact that a sense of an observer with respect to a resolution is easily affected by that of green light due to a human visual characteristic is taken into consideration, a high sense of resolution can be achieved at the time of viewing.

2. Second Exemplary Embodiment

Figure 8:
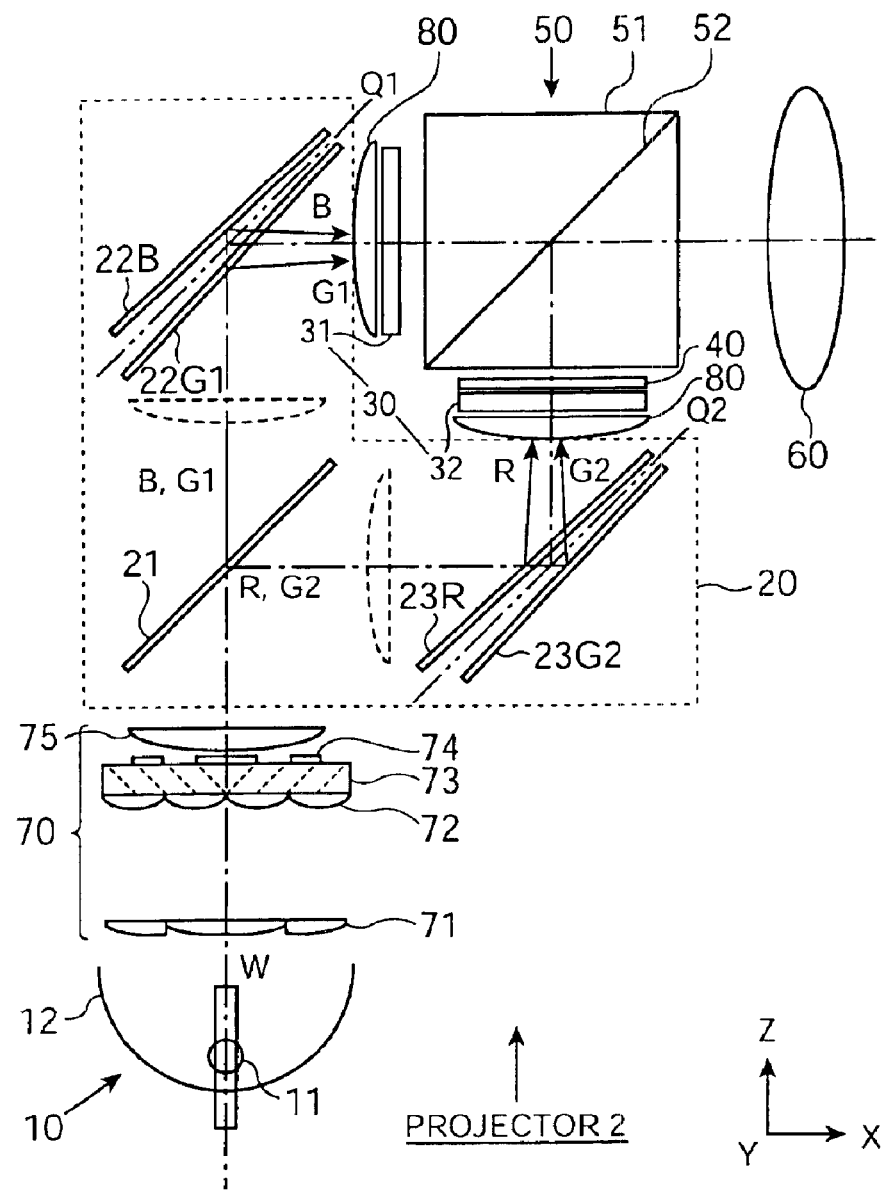
FIG. 8 is a schematic illustrating the structure of a projector according to a second exemplary embodiment of the present invention.

FIG. 8 illustrates the schematic structure of a projector 2 according to a second exemplary embodiment of the present invention. While the projector 2 has substantially the same structure as that of the projector 1 according to the first exemplary embodiment, it has two major differences from the projector 1 in which a polarization-converting optical system to convert light emitted from the light source 10 into a specific polarized flux, and a polarization rotating element to change the polarized state of a polarized flux emitted from the light-modulation optical system 30 are provided. Thus, in the following descriptions including the present exemplary embodiment, the same parts already mentioned are denoted by the same reference numerals and the descriptions thereof will be omitted or simplified.

The light source 10 and the dichroic mirror 21 serving as the first color-separation optical element have a polarization-converting optical system 70 arranged therebetween, including a first lens array 71 (flux dividing element), a second lens array 72 (collection optical element), a polarization-beam splitter array 73 (polarization separating element), a retardation film array 74 (polarization converting element), a superimposing lens 75 (superimposing element), and so forth. Meanwhile, since the polarization-converting optical system 70 used here is well known in the art, for example, as disclosed in detail in Japanese Unexamined Patent Application Publication No. 8-304739 (FIG. 8), its detail description will be omitted. An unpolarized flux emitted from the light source 10 is separated by the first and second lens arrays 71 and 72 and the polarization-beam splitter array 73 into a group of P-polarized fluxes and a group of S-polarized fluxes, the polarization directions of the P-polarized and S-polarized fluxes being orthogonal to each other, and the polarization direction of the group of the separated P-polarized fluxes is turned by the retardation film array 74 so as to be converted into the group of the S-polarized fluxes. Since the polarization direction of the group of the S-polarized fluxes is not turned by the retardation film array 74, all fluxes emitted from the retardation film array 74 are aligned so as to be S-polarized. The output directions of these polarized fluxes are directed by the superimposing lens 75 towards the first and second two-color-modulation liquid crystal panels 31 and 32 serving as objects to be illuminated, and are incident on the color-separation optical system 20.

A combination of the dichroic mirror 22G1 and the reflecting mirror 22B and another combination of the dichroic mirror 23R and the reflecting mirror 23G2 have collimating lenses 80 arranged at the corresponding output sides thereof to collect the corresponding polarized fluxes emitted from the superimposing lens 75 toward the center axes of each flux and then to make the almost collimated fluxes incident on the corresponding first and second two-color-modulation liquid crystal panels 31 and 32. Although a liquid crystal panel generally has a display characteristic dependent on an incident angle of light incident thereon, by arranging the collimating lenses 80, angular distributions of fluxes incident on the first and second two-color-modulation liquid crystal panels 31 and 32 can be made narrower. With this arrangement, the incident angle dependence of the display characteristic is lessened, thereby achieving high image quality and a high luminance of a projection image. Also, since the light collecting ability of the unit microlenses 331A is enhanced, a further smaller light spot can be formed, thereby reducing or preventing unnecessary color light from being incident on neighboring sub-pixels so as not to cause color mixture; as a result, a color image having excellent color reproductabity without exudation can be projected.

Since fluxes incident on the first to third color-separation optical elements are S-polarized by the polarization-converting optical system 70, the dichroic mirrors 21, 22G1, and 23R easily achieve a high reflectance. Especially, since the dichroic mirrors 21 and 23R are constructed so as to reflect S-polarized red light threat, even when a light source lamp (for example, a part of a metal halide lamp or a high-pressure mercury-vapor lamp) which emits red light having a relatively small light intensity is used as the light source, the red light can be fully utilized without being wasted. With this arrangement, the light intensity of the red light is easily balanced with those of the other kinds of color light, and a color expressible gamut of the projector can be expanded without reducing its light utilization efficiency, thereby achieving a bright projection image having excellent color balance.

Each of the four kinds of color light whose directions are separated by the second and third color-separation optical elements is incident on either of the first and second two-color-modulation liquid crystal panels 31 and 32 in the same fashion as in the projector 1; is optically modulated, independently from the remaining kinds of color light, on the basis of external image information (not shown); is partially converted into a P-polarized flux on the basis of the image information; and is emitted. Since the second two-color-modulation liquid crystal panel 32 has a polarization rotating element 40 arranged at the output side thereof, to rotate the polarization direction of light at about 90 degrees, the P-polarized flux modulated by the second two-color-modulation liquid crystal panel 32 is converted into an S-polarized flux, and then is incident on the color-synthesis optical system 50.

The four kinds of color light modulated by and emitted from the first and second two-color-modulation liquid crystal panels 31 and 32 are synthesized by the color-synthesis optical system 50 so as to form a color image. Two kinds of color light from the first and second two-color-modulation liquid crystal panels 31 and 32 are synthesized, respectively serving as transmitted light and reflected light. In this case, the two kinds of color light from the first and second two-color-modulation liquid crystal panels 31 and 32 are respectively a P-polarized flux and an S-polarized flux. When the fact that the dichroic prism 51 is likely to enhance its reflectance against S-polarized light in the same fashion as the dichroic mirrors is taken into consideration, the color-synthesis optical system 50 can synthesize the four kinds of color light at high efficiency, thereby achieving high image quality and a high luminance of a projection image. Meanwhile the arrangement configuration of the polarization rotating element 40 is not limited to the present exemplary embodiment. More particularly, the polarization rotating element 40 may be arranged at the incident side of the second two-color-modulation liquid crystal panel 32 so as to convert an S-polarized flux emitted from the color-separation optical system 20 into a P-polarized flux, and then to make it incident on the two-color-modulation liquid crystal panel 32, or, depending on the arrangement of the color-synthesis optical system 50, the polarization rotating element 40 may be arranged at the incident or output side of the first two-color-modulation liquid crystal panel 31. In short, it is sufficient that the polarization rotating element 40 is appropriately arranged so as to convert a flux treated as reflected light by the color-synthesis optical system 50 at least into an S-polarized flux.

The projector according to the second exemplary embodiment has the following advantages in addition to those described in the first exemplary embodiment. That is, by converting a flux incident on the color-separation optical system 20 into an S-polarized flux, and also by converting a flux treated as reflected light by the color-synthesis optical system 50 at least into an S-polarized flux, accurate color separation and color synthesis are effectively achieved, thereby achieving high image quality and a high luminance of a projection image. Since no of light source lamps which are currently available on the market have ideal color balance, it is required to establish the color balance of the four kinds of color light by reducing the intensity of a specific kind of color light at the expense of brightness. However, with the above-mentioned structure according to an aspect of the present invention, since the light utilization efficiency at the time of color separation and color synthesis can be enhanced, a projection image having a wide color expressible gamut can be formed without sacrificing brightness.

Modification 1

In place of the dichroic mirrors (plate-shaped) 21, 22G1, and 23R and the reflecting mirrors (plate-shaped) 22B and 23G2 in the first and second exemplary embodiments, the color-separation optical system 20 may be formed by a block-shaped dichroic prism. In this case, as described above, an incident angle of light incident on the dichroic surface can be made relatively small, thereby effectively performing color separation of the color light and suppressing occurrence of color unevenness when performing the color separation. Also, since the dichroic surface is unlikely to be warped, the directional separation of the four kinds of color light is accurately performed, thereby enhancing incident efficiency of color light incident on the corresponding sub-pixel, and also reducing or preventing unnecessary color light from being incident on the neighboring sub-pixels of the foregoing sub-pixels so as not to cause color mixture; as a result, a color image having excellent color reproductabity without exudation can be projected. In addition, by filling in front of and at rear of each dichroic mirror of the color-separation optical system 20 with a medium having a greater refractive index than air (for example, glass), the light path of a flux in the color-separation optical system 20 is reduced or prevented from being shifted, thereby easily arranging the optical systems and thus achieving a compact projector.

Also, in place of the dichroic prism 51, the color-synthesis optical system 50 may be formed by a plate-shaped dichroic mirror. In this case, reduction in weight and cost of the color-synthesis optical system is effectively achieved.

Modification 2

In the second exemplary embodiment, the two collimating lenses 80 may be arranged at the corresponding incident sides of the combination of the dichroic mirror 22G1 and the reflecting mirror 22B and the other combination of the dichroic mirror 23R and the reflecting mirror 23G2. When the collimating lenses 80 are arranged at the foregoing positions, the four kinds of S-polarized fluxes emitted from the superimposing lens 75 are collected toward the corresponding center axes thereof and the almost collimated fluxes are incident on the corresponding dichroic mirrors 22G1 and 23R. Since a dichroic mirror generally has a spectral characteristic dependent on an incident angle of light incident thereon, use of the collimating lens 80 makes angular distributions of fluxes incident on the dichroic mirrors 22G1 and 23R narrow, whereby the second and third color-separation optical elements accurately perform color separation, thus reducing or preventing unevenness of a projection image, and achieving high image quality and a high luminance of the projection image. In order to lessen the incident angle dependence of the spectral characteristic of the dichroic mirror, use of a wedge-type dichroic mirror having different spectral reflectance characteristics depending on its surfaces is feasible; however such a dichroic mirror is expensive. By arranging the collimating lenses 80 at the corresponding incident sides of the second and third color-separation optical elements, the expensive wedge-type dichroic mirror is not needed, whereby the above arrangement is suitable for reduction in cost of the optical systems.

Modification 3

Figure 9:
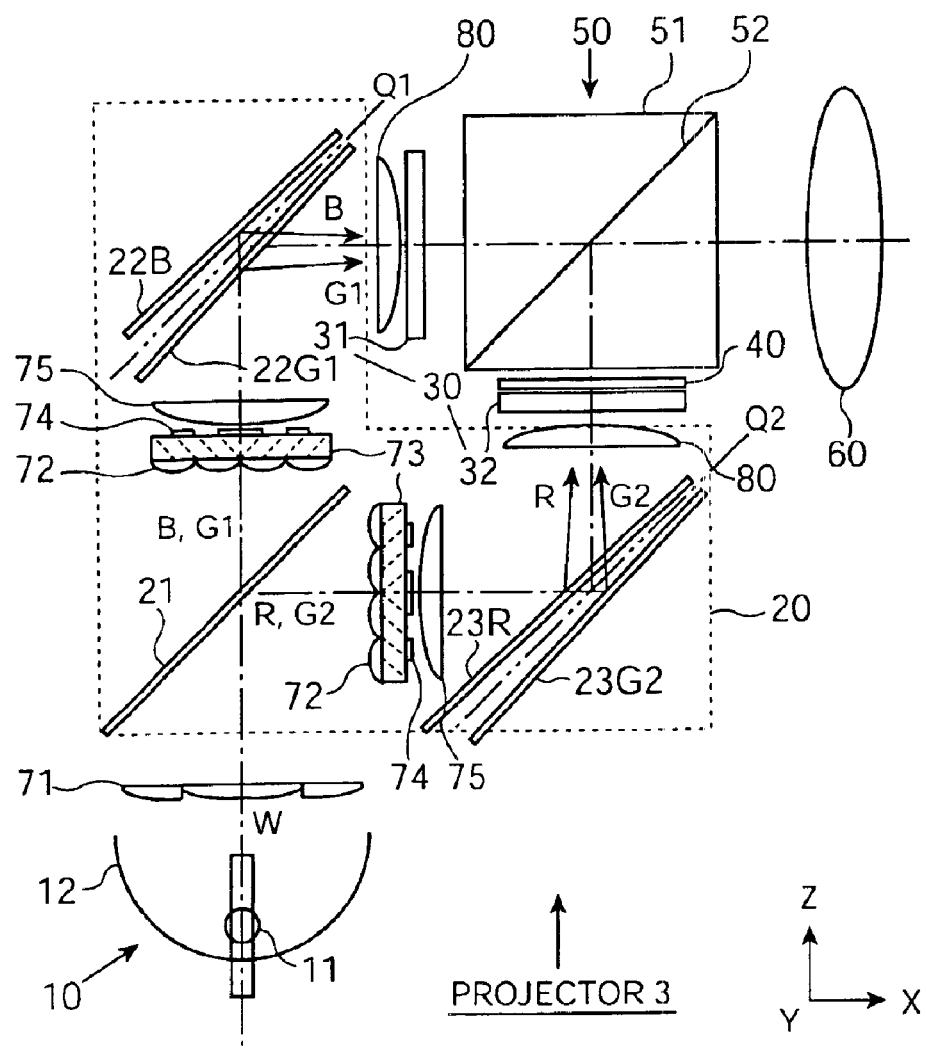
FIG. 9 is a schematic illustrating the structure of another projector according to the second exemplary embodiment of the present invention.

The way of arranging the polarization-converting optical system 70 in the second exemplary embodiment is not limited to the above-mentioned one (see FIG. 8). As shown in FIG. 9 by way of example, a projector 3 may be constructed such that the dichroic mirror 21 has the first lens array 71 arranged at the incident side thereof, and has the second lens array 72, the polarization-beam splitter array 73, the retardation film array 74, and the superimposing lens 75 arranged at each of the two output sides thereof. In this case, although the number of parts increases, the distance between the light source 10 and the light-modulation optical system 30 becomes shorter, thereby achieving compact optical systems. Also, in comparison to a structure in which a single polarization-beam splitter array is used as shown in FIG. 8, since the wavelength band of color light incident on either one of the two polarization-beam splitter arrays 73 and either one of the retardation film arrays 74 arranged at the two positions is limited and thus becomes narrower, the wavelength dependence of optical performances of the projector can be eased, thereby performing polarization conversion at further high efficiency. Meanwhile, in the second exemplary embodiment, the polarization-converting optical system 70 including the lens arrays serving as the flux dividing elements is used; alternatively, a polarization-converting optical system including a rod-like light-guiding member (for example, a glass rod) or a tube-like light-guiding member (for example, a hollow rod-like reflecting mirror) may be used.

Modification 4

Certain kinds of polarization rotating elements, one of which is used in the second exemplary embodiment, have a characteristic of rotating the polarization direction of light in a specific wavelength band. When such a polarization rotating element is arranged between the polarization-converting optical system 70 and the dichroic mirror 21 (first color-separation optical element), since only the color light passing through the dichroic mirror 21 can be selectively converted into a P-polarized flux, separation accuracy and efficiency of the dichroic mirror 21 to separate color light can be enhanced, whereby both expansion of a color expressible gamut and enhancement of brightness of a projection image can be achieved. Also, when such a polarization rotating element is arranged between the dichroic mirror 21 (first color-separation optical element) and the dichroic mirror 22G1 (second color-separation optical element), since only the color light passing through the dichroic mirror 22G1 can be selectively converted into a P-polarized flux, separation accuracy and efficiency of the dichroic mirror 22G1 to separate color light can be enhanced, whereby both expansion of a color expressible gamut and enhancement of brightness of a projection image can be achieved. In addition, when such a polarization rotating element is arranged between the dichroic mirror 21 (first color-separation optical element) and the dichroic mirror 23R (third color-separation optical element), the same advantages as mentioned above can be obtained.

Other Modifications

The present invention is not limited to the foregoing exemplary embodiments, and may include the following modifications. Although the liquid crystal panels included in the projectors according to the foregoing exemplary embodiments of the present invention are of a transmissive type, the present invention is not limited to this type. Also, although a combination of the first and second two-color-modulation liquid crystal panels 31 and 32 in which TFTs are used so as to serve switching elements is used as the light-modulation optical system, the present invention is not limited to this arrangement. Alternatively, liquid crystal panels in which thin film diodes (TFDs) are used so as to serve as switching elements may be used. In addition, even when polymer dispersed liquid crystal (PDLC) panels are used in a projector, the projector can be constructed so as to offer the same advantages as mentioned above. In short, the present invention is applicable to a variety of projectors, each including the light-modulation optical system to modulate a flux emitted from the light source. Also, although the pixels in the first and second two-color-modulation liquid crystal panels 31 and 32 are arranged in a matrix pattern in each of the foregoing exemplary embodiments, the present invention is not limited to the arrangement, and the pixels may be arranged in one of a variety of patterns, such as a stripe pattern and a triangular pattern.

Furthermore, although the dichroic mirror 21 to reflect the red light R and the green light G2 at the longer wavelength side is used so as to serve as the first color-separation optical element in the foregoing exemplary embodiments, the present invention is not limited to this arrangement. That is, a kind of color light to be reflected at the first color-separation optical element may be appropriately set in accordance with the characteristics of the light source, the light-modulation optical system, and the color-synthesis optical system. For example, when one of lamps, such as a halogen lamp, a xenon lamp, and a certain type of metal halide lamp, which emit blue light having a small relative intensity, is used so as to serve as the light source lamp, by constructing the projector such that the blue light B and the green light G1 at the shorter wavelength side are reflected at the first color-separation optical element, the projector easily maintains color balance of the four kinds of color light and magnifies a color expressible gamut of a projection image. Also, this can be applied to one of the four kinds of color light which is first reflected at and separated by the second and third color-separation optical elements. That is, when the blue light B is set as the color light which is first reflected at and separated by the second or third color-separation optical element, the projector easily maintains color balance of the four colors and magnifies a color expressible gamut of a projection image.

Other than the above-mentioned modifications, the concrete structure and shape of the projector according to an aspect of the present invention can be modified as long as they meet the technical spirit of the present invention.

Advantages

Since the foregoing projector according to an aspect of the present invention includes the light-modulation optical system formed by the two two-color-modulation electro-optical devices, a projection image having a large color expressible gamut can be formed by using the four kinds of color light. Also, in comparison to the known projectors using four kinds of color light, the projector according to an aspect of the present invention has advantages in high definition and a high luminance of a projection image compared to the time-sharing-type projector and the pixel-juxtaposing-type projector; reduction in size of the projector compared to the surface-dividing-type projector; and reduction in size and cost of the projector compared to the pixel-spatially-disposing-type projector having a similar structure to that of the projector of an aspect of the present invention. That is, according to an aspect of the present invention, a projector whose light utilization efficiency is relatively high, and which offers a high luminance and a wide color expressible gamut of a projection image, and reduction in size and cost of the projector can be well achieved.

What is claimed is:

1. A projector, comprising:

a light source to emit light including visible light;

a color-separation optical system to separate a flux emitted from the light source into four kinds of color light;

a light-modulation optical system including a first two-color-modulation electro-optical device to modulate any two of the four kinds of color light separated by the color-separation optical system and a second two-color-modulation electro-optical device to modulate the remaining two kinds of color light; and a color-synthesis optical system to synthesize the four kinds of color light modulated by the light-modulation optical system, each of the first and second two-color-modulation electro-optical devices include a pair of substrates; an electro-optical material sandwiched between the pair of substrates; a microlens array disposed on one of the pair of substrates and close to the color-separation optical system; and a plurality of sub-pixel electrodes formed on the other substrate and arranged so as to correspond to respective microlenses of the microlens array.

2. The projector according to claim 1, the color-separation optical system including a first color-separation optical element to separate a flux emitted from the light source into two kinds of color light; a second color-separation optical element to separate one of the two kinds of color light separated by the first color-separation optical element into further two kinds of color light; and a third color-separation optical element to separate the other kind of color light separated by the first color-separation optical element into further two kinds of color light.

3. The projector according to claim 2, further comprising:

a polarization converting optical system between the light source and the light-modulation optical system, to convert unpolarized light emitted from the light source into light whose polarization direction is aligned.

4. The projector according to claim 3, light emitted from the polarization converting optical system and whose polarization direction is aligned being S-polarized light.

5. The projector according to claim 3, further comprising:

a polarization rotating element disposed close to the output side of the polarization converting optical system, to rotate the polarization direction of light in a specific wavelength band at about 90 degrees, two kinds of color light passing through the first color-separation optical element being set to be P-polarized light and the remaining two kinds of color light reflected at the first color-separation optical element being set to be S-polarized light.

6. The projector according to claim 3, further comprising:

at least one polarization rotating element disposed at the incident side of at least one of the second and third color-separation optical elements, to rotate the polarization direction of light in a specific wavelength band at about 90 degrees, at least one of the four kinds of color light passing through at least one of the second and third color-separation optical elements being set to be P-polarized light, and at least one of the remaining two kinds of color light reflected at at least one of the second and third color-separation optical elements being set to be S-polarized light.

7. The projector according to claim 3, further comprising:

two collimating lenses respectively arranged at the incident sides of the second and third color-separation optical elements.

8. The projector according to claim 3, the polarization converting optical system includes a flux dividing element disposed between the light source and the first color-separation optical element; a group of a collection of optical elements, a polarization separating element, a polarization converting element, and a superimposing element, disposed between the first color-separation optical element and the second color-separation optical element; and another group of a collection of optical elements, a polarization separating element, a polarization converting element, and a superimposing element, disposed between the first color-separation optical element and the third color-separation optical element.

9. The projector according to claim 1, two kinds of color light reflected at and separated by the first color-separation optical element including one kind of color light whose light intensity is the smallest among the four kinds of color light emitted from the light source.

10. The projector according to claim 1, further comprising:

a polarization rotating element to rotate the polarization direction of light in a specific wavelength band, disposed at at least one of the incident and output sides of the two-color-modulation electro-optical device to modulate color light to be synthesized by reflection at the color-synthesis optical system, color light to be synthesized by reflection at the color-synthesis optical system being set to be S-polarized light.

11. The projector according to claim 1, further comprising:

two collimating lenses respectively arranged at the incident sides of the first and second two-color-modulation electro-optical devices.

12. The projector according to claim 1, one of the first and second two-color-modulation electro-optical devices modulating blue light and green light at the shorter wavelength side, and the other modulating green light at the longer wavelength side and red light.

13. The projector according to claim 12, a boundary wave length between the green light at the shorter wavelength side and the green light at the longer wavelength side being set approximately in the range from 515 nm to 540 nm.

14. The projector according to claim 12, positions of the four kinds of color light incident on corresponding sub-pixels are set such that sub-pixels in one of the two-color-modulation electro-optical devices, to modulate the green light at the shorter wavelength side, and other sub-pixels in the other two-color-modulation electro-optical device, to modulate the green light at the longer wavelength side, do not overlap with each other at the time of color synthesis.

* * * * *